United States Patent [19]

Matsumoto

[11] Patent Number: 4,785,355
[45] Date of Patent: Nov. 15, 1988

[54] IMAGE COMMUNICATION APPARATUS

[75] Inventor: Koichi Matsumoto, Tokyo, Japan

[73] Assignee: Canon Kabushiki Kaisha, Tokyo, Japan

[21] Appl. No.: 813,514

[22] Filed: Dec. 26, 1985

[30] Foreign Application Priority Data

Dec. 28, 1984 [JP] Japan ................................ 59-276466
Dec. 28, 1984 [JP] Japan ................................ 59-276467
Dec. 28, 1984 [JP] Japan ................................ 59-276468

[51] Int. Cl.⁴ .......................................... H04N 1/32
[52] U.S. Cl. .................................. 358/257; 358/286; 340/825.5
[58] Field of Search ................... 358/257, 256, 286; 340/825.5; 455/78

[56] References Cited

U.S. PATENT DOCUMENTS 4,113,992 9/1978 Gorham et al. .................... 358/257
4,607,289 3/1986 Kurokawa .......................... 358/257
4,654,718 3/1987 Sweyoshi ............................ 358/257

Primary Examiner—Edward L. Coles, Sr.
Attorney, Agent, or Firm—Fitzpatrick, Cella, Harper & Scinto

[57] ABSTRACT

An image communication apparatus comprises transfer means for transferring a transmitted image data, memory means for storing a transfer destination code, and instruction means for instructing the transfer to the transfer means. The transfer means transfers the image data in response to the instruction by the instruction means in accordance with the transfer destination code stored in the memory means.

16 Claims, 8 Drawing Sheets

IMAGE COMMUNICATION APPARATUS

BACKGROUND OF THE INVENTION

Field of the Invention

The present invention relates to image communication apparatus for commnicating an image data.

Description of the Prior Art

Many prior art of apparatus facsimile and similar apparatus have auto-receive functions so that texts are automatically received even if no operators at the receiving station. However, a text which should reach the operator urgently at the receiving station does not reach the operator until he/she returns to the location of the facsimile machine to which the text has been transmitted from the sending station.

SUMMARY OF THE INVENTION

It is an object of the present invention to remove the drawbacks of the prior art as above-mentioned.

It is another object of the present invention to provide an improved image communication apparatus.

It is another object of the present invention to provide an image communication apparatus which communicates an image to an operator site.

It is another object of the present invention to provide an image communication apparatus which can selectively transfer an image to an operator site.

It is other object of the present invention to provide an image communication apparatus which can transfer an image to an operator at the receiving side with an additional message.

Other objects of the present invention will be apparent from the following description of the invention and the appended claims.

DETAILED DESCRIPTION OF THE PREFERRED EMBODIMENTS

Figure 1:
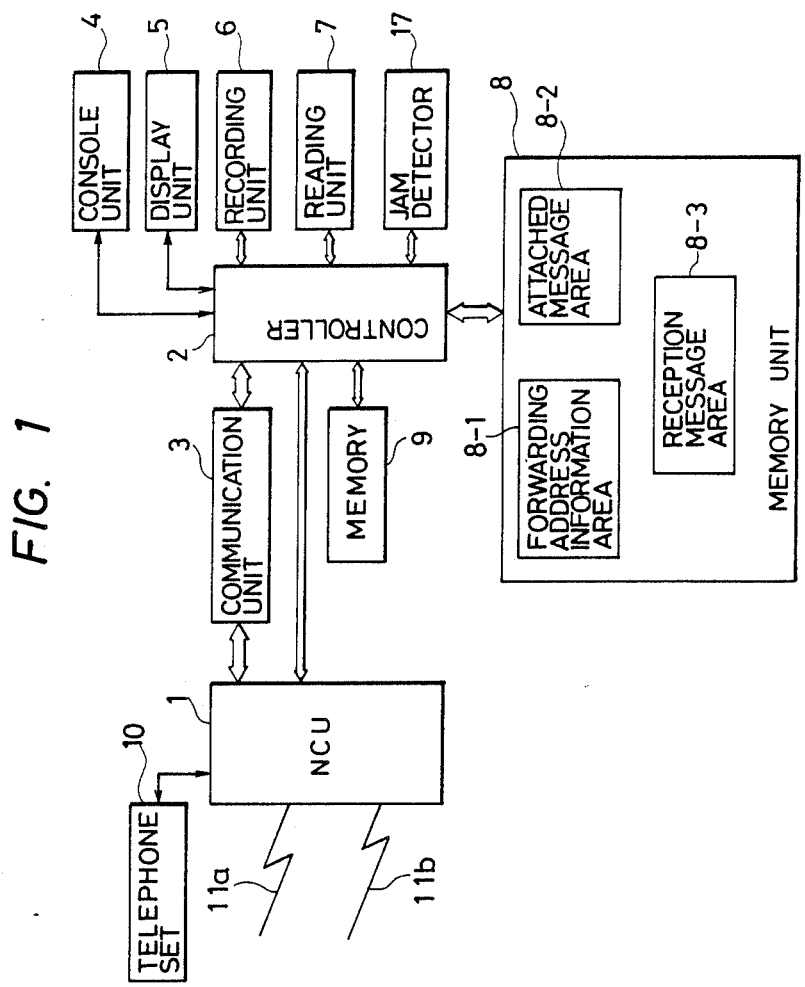
FIG. 1 shows an overall configuration of one embodiment of a facsimile machine.

FIG. 1 is a block diagram of an overall configuration of one embodiment of a facsimile machine.

In FIG. 1, numeral 1 denotes a network control unit (NCU) which controls a telephone network. Numeral 2 denotes a control unit which controls the entire facsimile machine. The control unit 2 comprises a microcomputer and a peripheral device such as a RAM. Numeral 3 denotes a communication unit which modulates, demodulates, decodes and encodes an image signal. The communication unit 3 comprises a modem for modulating and demodulating the image signal and a decoder/encoder for decoding and encoding the image signal. Numeral 4 denotes a console unit by which the facsimile machine is operated and information is inputted. Numeral 5 denotes a display unit which displays the information. The display unit 5 comprises a display such as a liquid crystal display. Numeral 6 denotes a record unit which records the image. The record unit 6 is usually a printer used in the facsimile machine. Numeral 7 denotes a read unit which reads the image. The read unit 7 is usually a reader having CCD used in the facsimile machine. Numeral 8 denotes a memory unit which stores therein information relating to the transfer, as well as received messages. The memory unit 8 is a non-volatile RAM. Numeral 8-1 denotes a transfer destination information area (or the forwarding address information area) which stores therein the transfer destination and information on the transfer destination. Numeral 8-2 denotes an additional (or attached) message area which stores therein the message added when the image is transferred. Numeral 8-3 denotes a received message area which stores therein the received message. Numeral 9 denotes a memory which stores therein a control program for the control unit 2. Numeral 10 denotes a telephone set. Numeral 17 denotes a jam detector. When it detects a paper jam, it sends a jam detection signal to the control unit 2.

Figure 2:
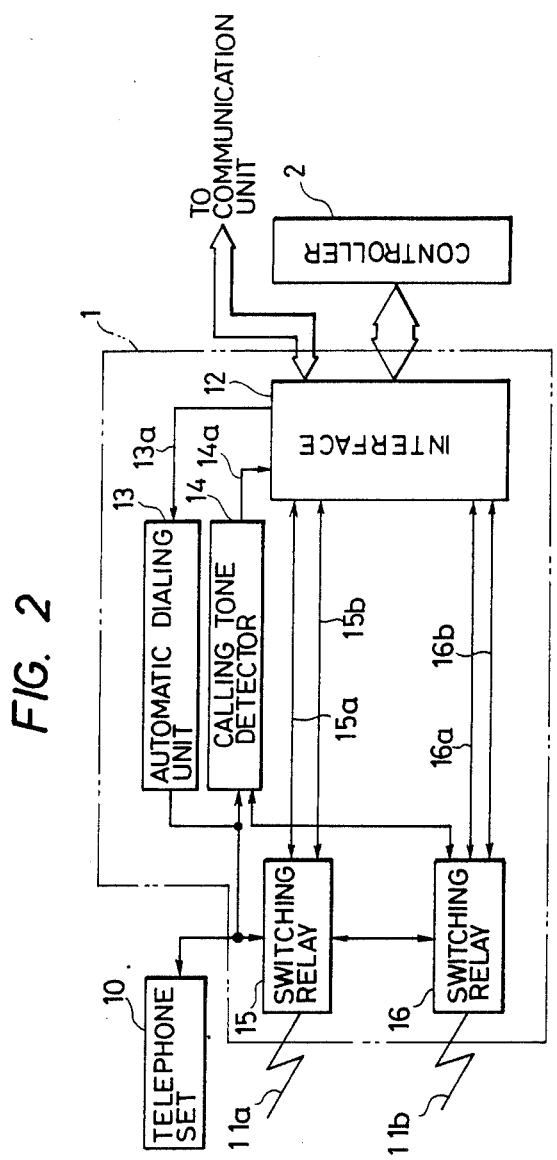
FIG. 2 shows a detail of an NCU 1 of FIG. 1.

FIG. 2 shows a detail of the NCU 1. Numeral 12 denotes an interface. Numeral 13 denotes an autodialing unit. When it receives a dialing signal from the control unit 2 through the interface 12 and a signal line 13a, it dials to telephone lines 11a and 11b connected to the NCU 1. Numeral 14 denotes a calling tone detector. When it detects a calling tone from the telephone line 11a or 11b, it sends a calling tone detection signal to the control unit 2 through a signal line 14a and the interface 12. Numerals 15 and 16 denote switching relays which switch connections between the telephone lines 11a and 11b and the telephone set 10, signal 15a and 16a, and connection between the telephone lines 11a and 11b by switching signals 1, 2 and 3 sent from the control unit 2 through the interface 12 and the signal lines 15b and 16b.

Figure 3:
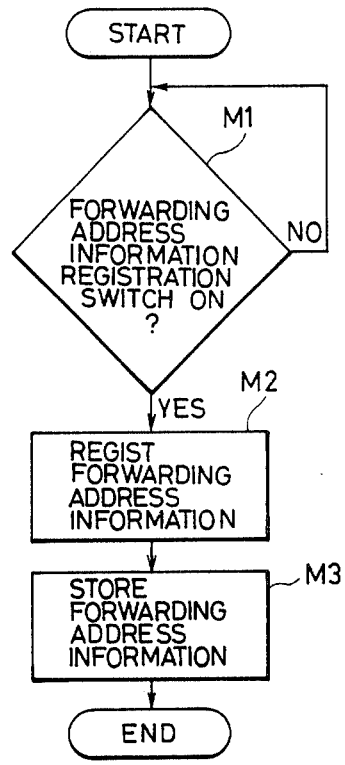
FIG. 3 is a flow chart showing a registration procedure of transfer destination.

FIG. 3 is a flow chart for registering transfer destination information. In a step M1 of FIG. 3, a status of a transfer destination information registration switch (not shown) of the console unit 4 is checked, and if it is on, the process proceeds to a step M2 to start a transfer destination (or "forwarding address") information registration mode, and the transfer destination information is registered by a key switch (not shown) of the console unit 4. In a step 3, the transfer destination information is stored in the transfer destination information area 8-1 of the memory 8. The transfer destination information includes a transfer destination dial number, the presence or absence of an additional message and a communication mode. Such transfer destination information is supplied to the memory unit 8 as code information by the key switch of the console unit 4.

Figure 4:
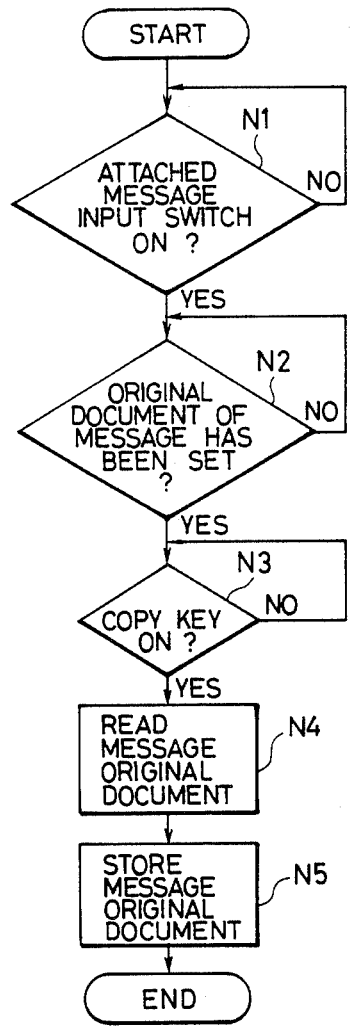
FIG. 4 is a flow chart showing a store procedure of an additional message.

FIG. 4 is a flow chart for inputting an additional message.

In a step N1, a status of an additional message input switch (not shown) of the console unit 4 is checked, and if it is on, the process proceeds to a step N2. In the step N2, whether the text with the additional message has been set to the read unit 7 or not is checked, and if it has, the process proceeds to a step N3. In a step N3, a status of a copy key (not shown) of the console unit 4 is checked, and if it is on, the process proceeds to the step N4 where the read unit 7 reads the additional message.

In a step N5, the read additional message data is stored in the additional message area 8-2 of the memory unit 8.

In this manner, the transfer destination information and the additional message are stored in the memory unit 8.

Figure 5A:
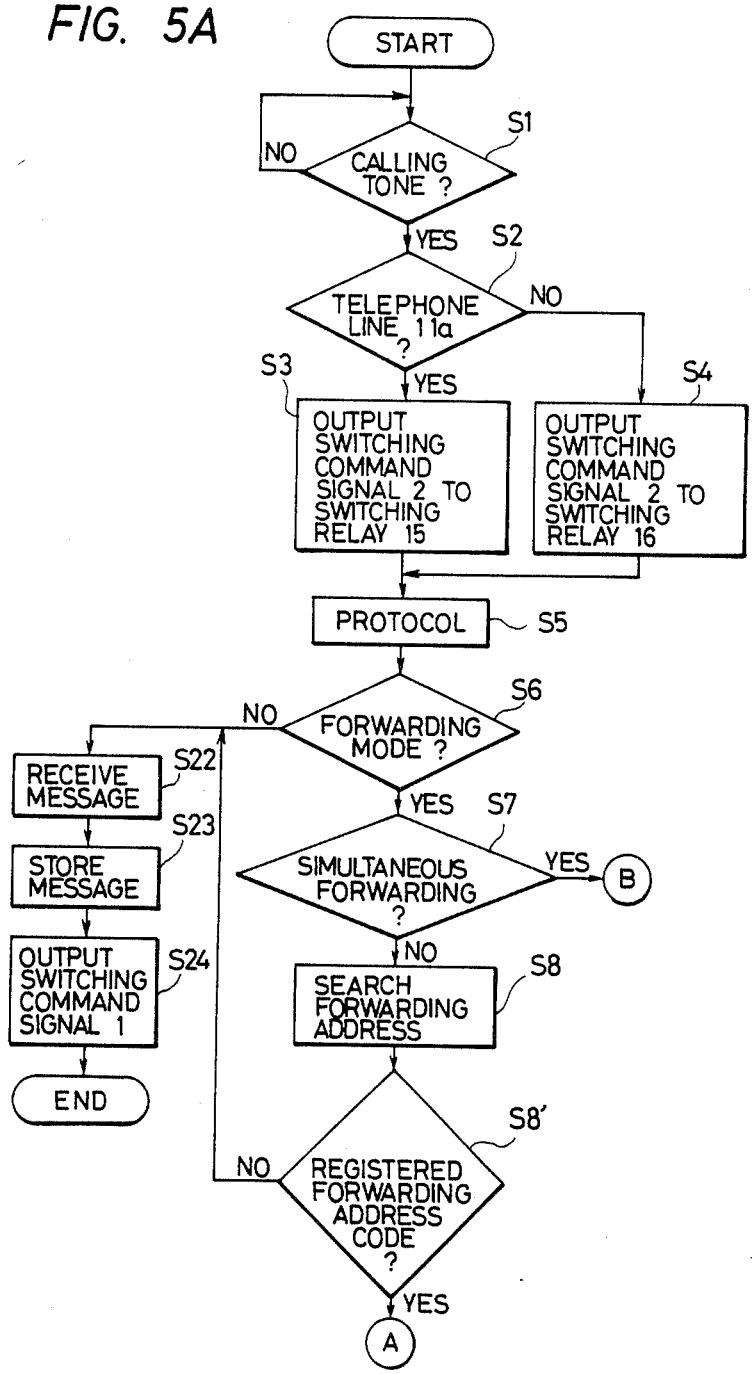
FIGS. 5A-B show a control flow charts of a control unit 2.
Figure 5B:
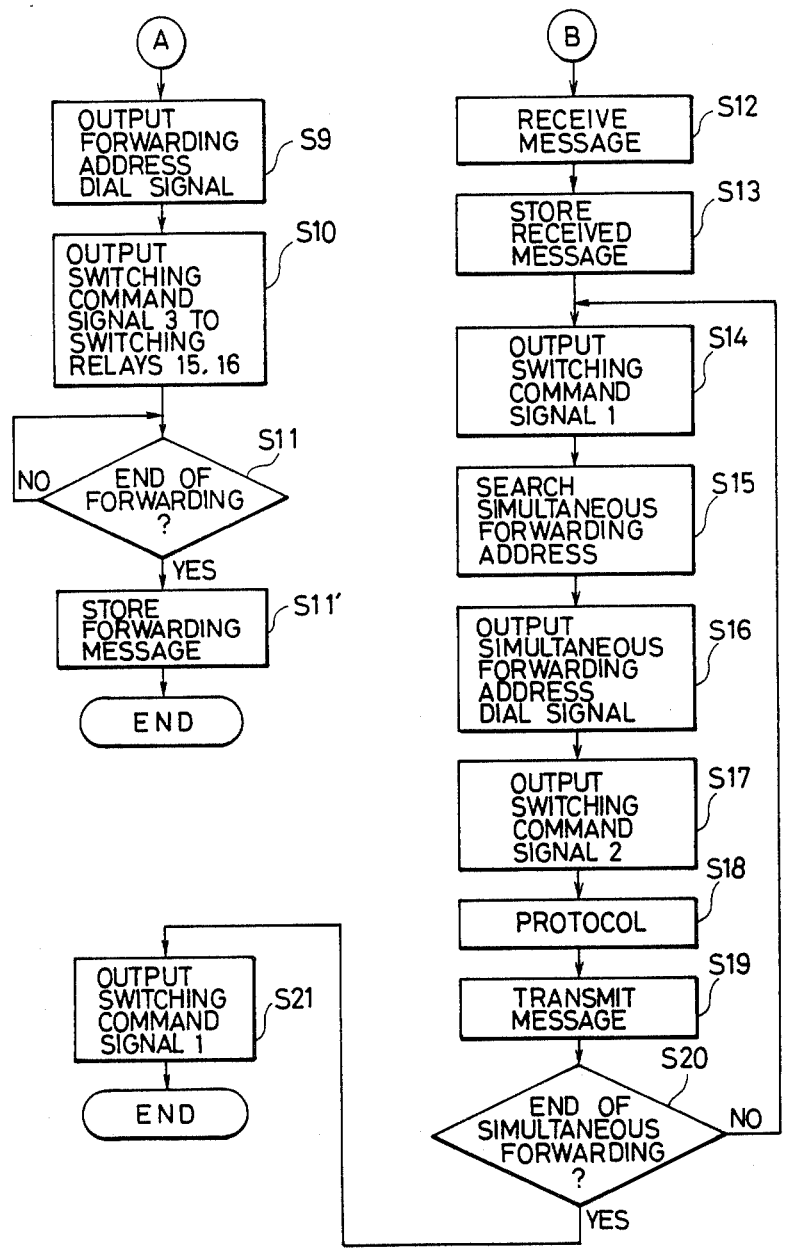
Figure 6:
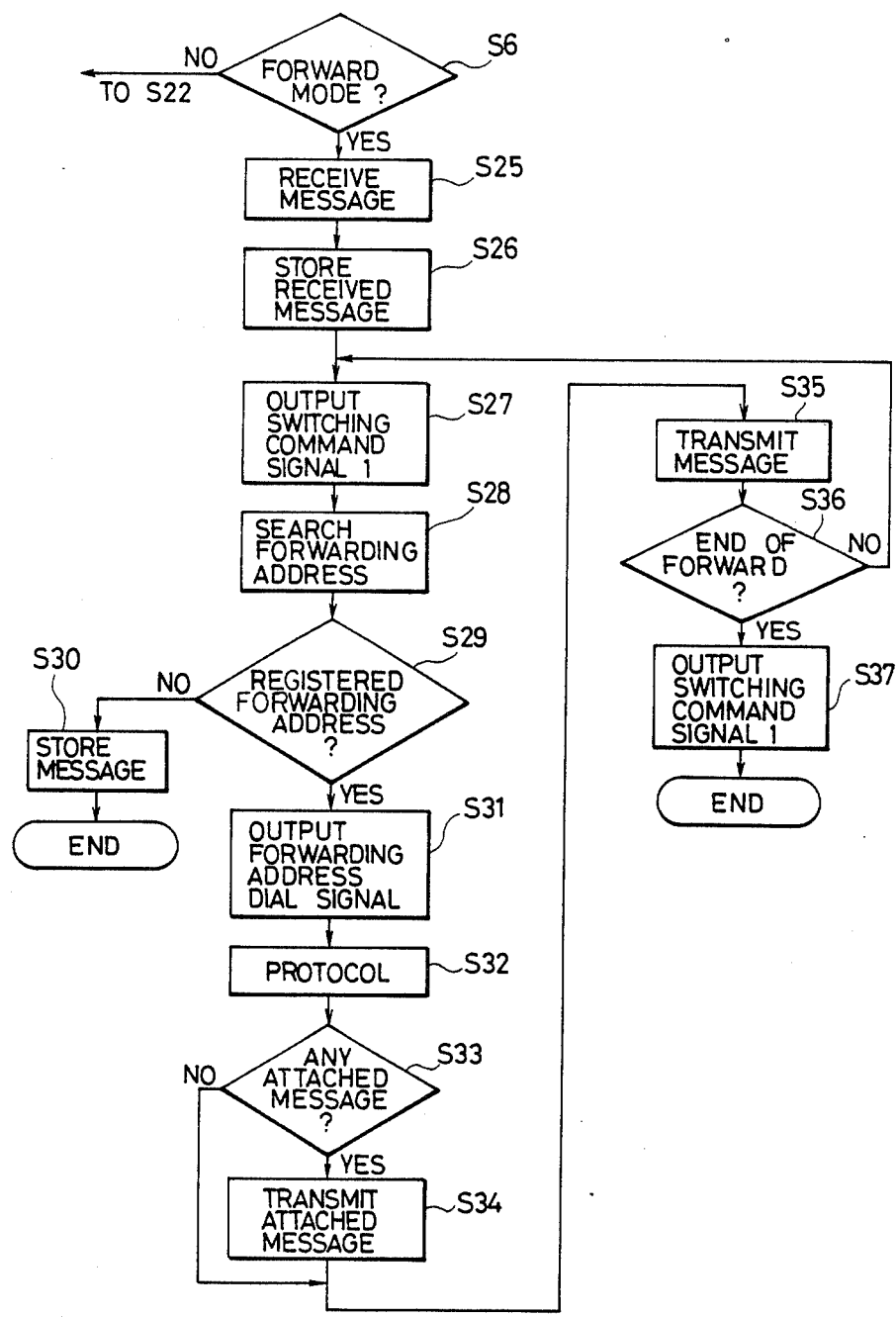
FIG. 6 is a control flow chart of a control unit 2 in another embodiment.

FIGS. 5 and 6 are control flow charts of the control unit 2 of the present embodiment. The present embodiment is now explained with reference to FIGS. 5 and 6.

In a step S1, whether the calling tone detection signal has been received or not is checked. If it has, the process proceeds to a step S2. In the step S2, whether the calling tone is from the telephone line 11a or not is checked, and if it is, the process proceeds to a step S3, and if it is not, the process proceeds to a step S4. In the step S3, a switching command signal 2 is sent out to the signal line 15b, and the telephone line 11a is switched to the signal line 15a connected to the facsimile machine. Then, the process proceeds to a step S5.

In the step S4, the switching command signal 2 is sent out to the signal line 16b and the telephone line 16b is switched to the signal line 15a connected to the facsimile machine. Then, the process proceeds to a step S5.

In the step S5, a protocol for the facsimile communication is carried out. Function information of the facsimile machine at the called station is included in to a facsimile information field (FIF) of a non-standard facsimile equipment (NSF) signal sent from the called station to the calling station during the protocol. The information includes the presence or absence of the transfer function, whether the receiving machine is in the transfer mode or not and a telephone number of an operator side at the called station. When the calling station facsimile machine receives the signal NSF, it sends a non-standard facsimile equipment setting (NSS) signal based on the NSF signal. The mode of the called station facsimile machine is set to the transfer mode by the NSS signal.

In a step S6, the mode is checked based on the NSS signal, and if it is the transfer mode, the process proceeds to a step S7, and if it is not the transfer mode, the process proceeds to steps S22, S23 and S24 to receive and record the message in a normal manner, and the telephone line is switched to the telephone set to terminate the receiving operation.

If the mode is the transfer mode in the step S6, the process proceeds to the step S7. In the step S7, whether the information is to be transferred to a number of stations (broadcast) or not is checked. This information is also supplied to the FIF of the NSF signal and NSS signal.

In the step S7, if it is broadcasting, the process proceeds to a step S12, and if it is not, the process proceeds to a step S8. In the step S8, the transfer destination is searched to retrieve a transfer destination dial number and transfer destination information. The calling station facsimile machine supplies the transfer destination code to the FIF of the NSS signal to send it to the called station facsimile machine. When the called station receives the NSS signal, it searches for the transfer destination information registered in the transfer destination information area 8-1 of the memory unit 8 based on the transfer destination code so that the transfer destination is retrieved.

In a step S8', whether the transfer destination code sent from the calling station has been registered or not is checked, and if it has, the process proceeds to a step S9, and if it has not, the process proceeds to step S22 and the message is received and recorded. The called station facsimile machine records on a record paper the transfer destination code and a mark or characters indicating that transfer is desired for example, "transfer wanted".

In the step S9, the transfer destination dial signal is supplied to the auto-dialing unit 13 to call the transfer destination, and when the transfer destination is connected to the telephone line, the process proceeds to a step S10. If the calling station sends a calling signal through the telephone line 11a, the telephone line 11b is used, and if the calling station sends the calling signal through the telephone line 11b, the telephone line 11a is used to call the transfer destination.

In the step S10, the switching command signal is sent to the switching relays 15 and 16 to connect the telephone line 11a to the telephone line 11b so that the calling station is connected to the transfer destination and the transfer is carried out. The protocol for the facsimile machine is performed between the transfer destination and the calling station.

In a step S11, the end of transfer is checked, and if the transfer has been ended, the switching command signal 1 is supplied to the switching relays 15 and 16 so that the telephone lines 11a and 11b are switched to the telephone set and the transfer operation is terminated. In a step S11', a message indicating the completion of the transfer is recorded on a record sheet.

If it is detected in the step S7 that the message is to be broadcast, the process proceeds to a step S12. In the step S12, the message is received, and in a step S13, the received message is stored in the received message area 8-3 of the memory unit 8 and the transfer destination code is stored in the memory 9. In a step S14, the switching command signal 1 is supplied to the switching relays 15 and 16 to switch the telephone line to the telephone set. In a step S15, the transfer destination is searched. In a step S16, the transfer destination dial signal is supplied to the auto-dialing unit 13 to call the transfer destination. The telephone line 11a is normally used but if it is busy, the telephone line 11b is used. In a step S17, when the telephone line 11a is connected to the transfer destination, the switching command signal 2 is supplied to the switching relay 15 to switch the telephone line 11a to the facsimile machine. In a step S18, the protocol is performed. In a step S19, the received message stored in the received message area 8-3 of the memory 8 is sent to the transfer destination. In a step S20, whether the transfer is completed or not is checked. If there is another transfer destination, the process proceeds to the step S14 where the message is transferred to the next transfer destination. In a step S21, the switching command signal 1 is supplied to the switching relay 15 to switch the telephone line 11a to the telephone set. In this manner, the transfer (broadcasting) of the message to the multiple stations is carried out.

In the above operation, the calling station requests the transfer. Usually, however, the called station requests the transfer. In this case, the console unit 4 selects the transfer mode and inputs the transfer destination code. As a result, the called station facsimile machine is set into the transfer mode and the text sent from the calling station is transferred.

In the step S7, whether the transfer is to multiple stations or not is checked. If there is only one transfer destination, the memory unit 8 is not used, but the telephone lines 11a and 11b are connected to transfer the message. Accordingly, the load to receive and record the message and then transfer it is saved and the cost can be reduced.

In the step S8', whether the transfer destination code has been registered or not is checked. If it has not been registered, the message is received and recorded and the calling station operator can convey to the called station operator the request of the transfer to the unregistered station. In this manner, the called station operator can transfer the message.

An embodiment in which the received message is transferred to the transfer destination with an additional message is shown in FIG. 6.

The steps S1 to S6 in FIG. 6 are identical to those of FIG. 5. The steps after S6 are modified as follows.

In a step S6, the mode is checked, and if it is the transfer mode, the process proceeds to a step S25. In the steps S25 and S26, the message is received and recorded, and in a step S27, the switching command signal 1 is supplied to the switching relay to switch the telephone line to the telephone set. In a step S28, the transfer destination is retrieved. In a step S29, whether the transfer destination has been registered or not is checked. if it has not, the process proceeds to a step S31, and if it has, the process proceeds to a step S30 where the message and the mark indicating the desire of transfer are recorded. In the step S31, the transfer destination dial signal is sent, and when the telephone line is connected to the transfer destination, the telephone line is switched to the facsimile machine. in a step S32, the protocol is carried out. The telephone line 11a is normally used for this purpose. In a step S32, the presence or absence of the additional message is checked. If it is present, the process proceeds to a step S34, and if it is absent, the process proceeds to a step S35. In the step S34, the additional message is read from the additional message area 8-2 of the memory unit 8 and sent. At the end of the transmission of the additional message, the process proceeds to a step S35 where the message is transmitted. The called station facsimile machine prints out a message indicating the transfer on a record sheet so that the called station operator can identify the transfer of the text. In a step S36, whether there is another transfer destination or not is checked. If there is, the process proceeds to a step S27, and if there is no transfer destination, the process proceeds to a step S37 to switch the telephone line to the telephone set to terminate the transfer operation.

Figure 7:
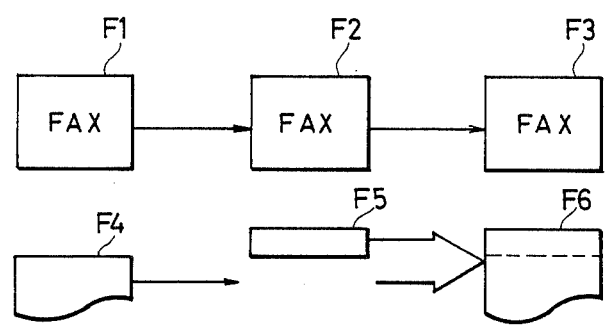
FIG. 7 illustrates an image data with an additional message.

FIG. 7 illustrates the transmission with the additional message. A message F4 is sent from a FAX, F1, and an additional message F5 is added by a FAX F2, and those messages are transferred to a FAX F3. Examples of the additional message is "This is transfer of the message from . . . " or "This is the image data from . . . to . . . ". It need not appear at the top of the text.

By transmitting the message with the additional message, the user can identify that the message has been transferred.

If the jam detector 17 detects jam, the console unit 4 may instruct to transfer the message to another machine.

Figure 8:
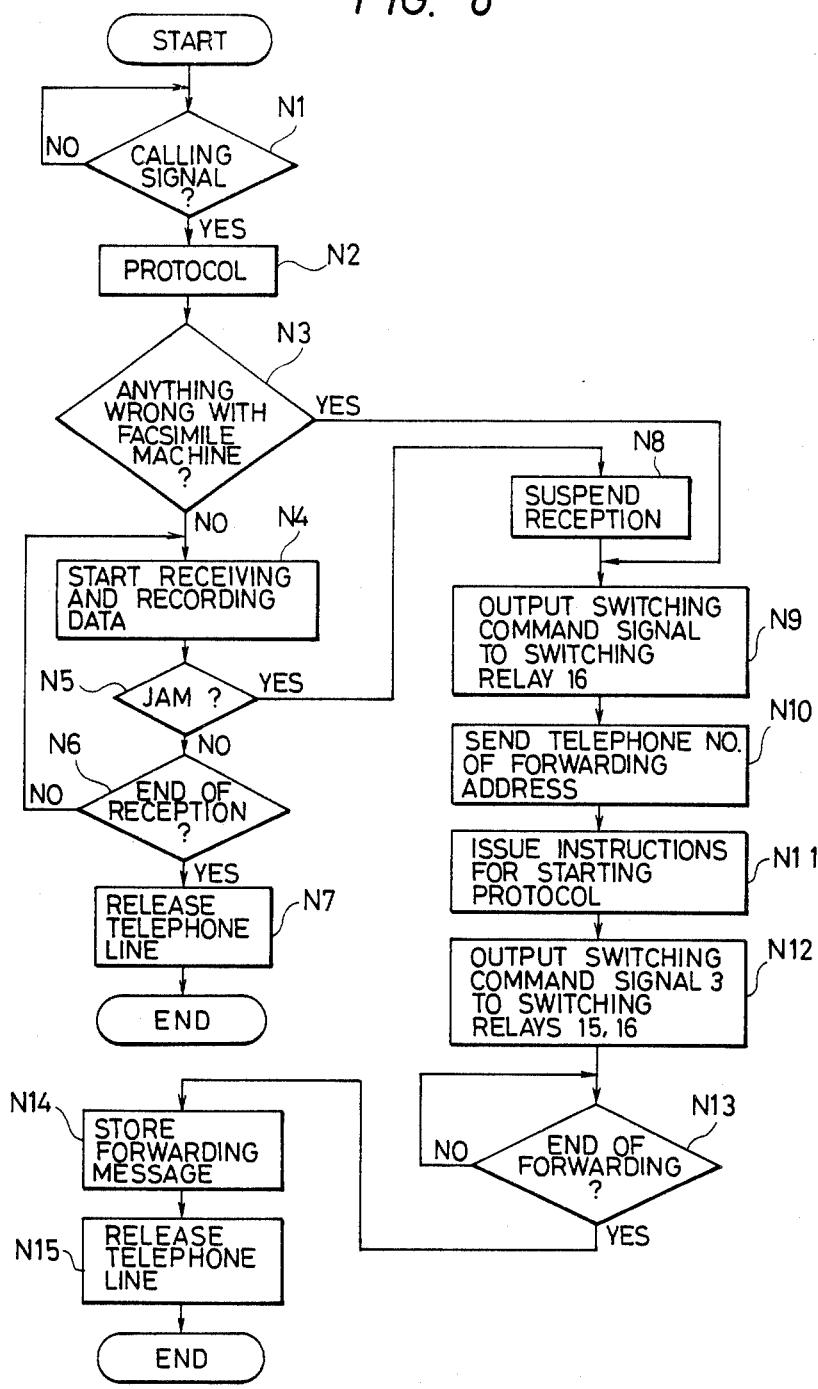
FIG. 8 is a flow chart for image transfer in the case of error.

FIG. 8 shows a flow chart of a control operation of the control unit 2 for this purpose. When the record sheets have been exhausted or the machine is out of order, the message may also be transferred to another machine.

In a step N1 of FIG. 8, if a calling signal from the line 11a or 11b is detected, that line is connected to the facsimile machine. In a step N2, the protocol is carried out. In a step N3, the status of the facsimile machine is checked, and if it is in order, the process proceeds to a step N4 where a normal reception operation is carried out. If the machine is out of order in the step N3, the process proceeds to a step N9 to transfer the image data. The abnormal status of the facsimile machine in the step N3 may include the lack of the record sheet and the jam of the record sheet. In the steps N4 to N6, the image data is received and recorded. If the jam occurs during the reception of the image data, the process proceeds from the step N5 to a step N8 where the reception and recording of the message is suspended and the process proceeds to a step N9. In the steps N9 to N15, the image data is transferred to the designated transfer destination. This operation is similar to the transfer operation explained unit reference to FIGS. 5 and 6. Thus, even if there is an error during the reception operation or the facsimile machine is out of order such as the jam or the lack of the record sheet, the image data is transferred to the designated destination and the operator there can receive the text image.

In the present embodiment, the transfer is carried out on request by the calling station or the called station, and all of the texts are transferred. An operation to transfer only those texts of the texts sent from the calling station which are to be urgently reached to the called station operator is now described.

When the called station operator will be absent, he/she inputs the transfer destination telephone number and sets the facsimile machine to a transfer request mode. The calling station facsimile machine calls the called station and the protocol is carried out between the calling station facsimile machine and the called station facsimile machine. Information indicating that the called station facsimile machine is in the transfer request mode is added or the NFS signal in the protocol. The calling station facsimile machine responds to the NFS signal to indicate that the called station facsimile machine is in the transfer request mode. Thus, the calling station operator knows that the called station operator is absent. For an urgent text, the calling station operator adds to the NSS signal a code instructing to set the called station facsimile machine to the transfer mode, by a key operation. The called station facsimile machine responds to the NSS signal to be set to the transfer mode, and transfers the text received from the calling station. If the calling station operator does not add the instruction code to the NSS signal, normal facsimile communicating is carried out.

By controlling the shift of the mode of the called station facsimile machine to the transfer mode in this manner, only the urgent text can be transferred.

The present invention is not limited to the above embodiments but various modifications thereof may be made within the scope of the appended claims.

The present invention is applicable to not only the facsimile machine but also any image communication apparatus which communicates image data.

I claim:

1. An image communication apparatus comprising:
   receive means for receiving image data;
   transfer means for transferring image data received by said receive means;
   set means for manually setting dial information of a transfer destination of said apparatus;
   first memory means for storing dial information set by said set means; and instruction means for instructing said transfer means to execute transfer operation thereof,
wherein said transfer means transfers the image data to a transfer destination stored in said first memory means in response to the instruction by said instruction means.

2. An image communication apparatus according to claim 1, wherein said transfer means includes communication line control means for controlling a plurality of communication lines, and said transfer means transfers the image data via a non-busy one of said communication lines.

3. An image communication apparatus according to claim 2, wherein two communication lines are provided.

4. An image communication apparatus according to claim 1, wherein said transfer means includes second memory means for storing the image data and transfers the image data temporarily stored in said second memory means.

5. An image communication apparatus according to claim 1, wherein said transfer means includes send means for sending a dial signal in accordance with the dialing information stored in said first memory means, and said said instruction means to send the dial signal to a communication line.

6. An image communication apparatus comprising:
receive means for receiving image data;
transfer means for transferring the image data received by said receive means;
first memory means for storing dial information of a transfer destination; and
second memory means for storing a message indicating that the image data is to be transferred,
wherein said transfer means transfers the received image data and the message stored in said second memory means to the transfer destination stored in said first memory means.

7. An image communication apparatus according to claim 6, wherein said transfer means includes communication line control means for controlling a plurality of communication lines, and said transfer means transfers the image data via a non-busy one of said communication lines.

8. An image communication apparatus according to claim 7, wherein two communication lines are provided.

9. An image communication apparatus according to claim 6, wherein said transfer means includes third memory means for storing the image data and transfers the image data temporarily stored in said third memory means.

10. An image communication apparatus according to claim 6, further comprising instruction means for instructing transfer of the image data, wherein said transfer means includes send means for sending a dial signal in accordance with the dialing information stored in said first memory means, and said send means responds to the instruction by said instruction means to send the dial signal to the communication line.

11. An image communication apparatus comprising:
receive means for receiving image data;
record means for recording image data;
transfer means for transferring the image data received by said receive means;
first memory means for storing dial information of a transfer destination;
second memory means for storing a message indicating that it is requested to transfer the image data; and
control means adapted to transfer image data on the basis of dial information stored in said first memory means when dial information of a transfer destination to which a calling station requests to transfer the image data is stored in said first memory means, and adapted to enable said record means to record the image data and the message stored in said second memory means when dial information of a transfer destination to which the calling station requests to transfer the image data is not stored in said first memory means.

12. An image communication apparatus according to claim 11, wherein said transfer means includes communication line control means for controlling a plurality of communication lines, and said transfer means transfers the image data via a non-busy one of said communication lines.

13. An image communication apparatus according to claim 12, wherein two communication lines are provided.

14. An image communication apparatus comprising:
receive means for receiving image data;
transfer means for transferring the image data received by said receive means;
memory means for storing dial information of a transfer destination; and
abnormal state detection means for detecting an abnormal state of said apparatus, the abnormal state being one which prevents said apparatus from properly outputting received image data,
wherein said transfer means transfers the image data to a transfer destination stored in said memory means in response to a detection output from said abnormal state detection means.

15. An image communication apparatus according to claim 14, wherein said abnormal state detection means detects a jam.

16. An image communication apparatus according to claim 14, wherein said abnormal state detection means detects lack of record sheet.

* * * * *

UNITED STATES PATENT AND TRADEMARK OFFICE
CERTIFICATE OF CORRECTION

PATENT NO. : 4,785,355
DATED : November 15, 1988
INVENTOR(S) : KOICHI MATSUMOTO            Page 1 of 3

It is certified that error appears in the above-identified patent and that said Letters Patent is hereby corrected as shown below:

IN [56] REFERENCES CITED

"Sweyoshi" should read --Sueyoshi--.

COLUMN 1

Line 6, "to image" should read --to an image--.
    Line 7, "commnicating an" should read --communicating--.
    Line 9, "of apparatus" should be deleted.
    Line 11, "operators at" should read --operators are present at--.
    Line 29, "other" should read --another--.

COLUMN 2

Line 36, "signal 15a and 16a," should read --signal lines 15a and 16a,--.
    Line 50, "step 3," should read --step M3,--.

COLUMN 3

Line 20, "telephone line 16b" should read --telephone line 11a--.
    Line 25, "to" should be deleted.

UNITED STATES PATENT AND TRADEMARK OFFICE
CERTIFICATE OF CORRECTION

PATENT NO. : 4,785,355
DATED : November 15, 1988
INVENTOR(S) : KOICHI MATSUMOTO

Page 2 of 3

It is certified that error appears in the above-identified patent and that said Letters Patent is hereby corrected as shown below:

COLUMN 4

Line 3, "desired" should read --desired,--.
    Line 40, "used" (first occurrence) should read --used,--.

COLUMN 5

Line 7, "of" should read --for--.
    Line 23, "if" should read --If--.
    Line 29, "in" should read --In--.

COLUMN 6

Line 16, "unit" should read --with--.
    Line 36, "or" should read --to--.
    Line 49, "communicating" should read --communication--.

UNITED STATES PATENT AND TRADEMARK OFFICE
CERTIFICATE OF CORRECTION

PATENT NO. : 4,785,355
DATED : November 15, 1988
INVENTOR(S) : KOICHI MATSUMOTO

Page 3 of 3

It is certified that error appears in the above-identified patent and that said Letters Patent is hereby corrected as shown below:

COLUMN 7

Line 25, "said said" should read --said send means responds to said--.

Signed and Sealed this

Thirty-first Day of October, 1989

*Attest:*

DONALD J. QUIGG

*Attesting Officer*   *Commissioner of Patents and Trademarks*